United States Patent [19]

Sidoti et al.

[11] Patent Number: 4,590,085

[45] Date of Patent: May 20, 1986

[54] FLAVOR ENHANCEMENT AND POTENTIATION WITH BEER CONCENTRATE

[75] Inventors: Daniel R. Sidoti, Ballwin; John H. Dokos, St. Louis; Edward Katz, St. Louis; Charles M. Moscowitz, St. Louis, all of Mo.

[73] Assignee: Anheuser-Busch Incorporated, St. Louis, Mo.

[21] Appl. No.: 713,770

[22] Filed: Mar. 18, 1985

Related U.S. Application Data

[63] Continuation-in-part of Ser. No. 474,085, Mar. 10, 1983, abandoned.

[51] Int. Cl.$^4$ .............................................. A23L 1/221
[52] U.S. Cl. .................................. 426/582; 426/589; 426/639; 426/650; 426/14; 426/592; 426/495; 426/494
[58] Field of Search ................. 426/14, 493, 494, 592, 426/650, 582, 589, 639

[56] References Cited

U.S. PATENT DOCUMENTS 1,228,917  6/1917  Heuser .......................... 426/592 X
1,290,192  1/1919  Heuser ............................. 426/14

FOREIGN PATENT DOCUMENTS 2127  4/1900  United Kingdom .................. 426/14

OTHER PUBLICATIONS

Fahy, Cooking With Beer, 1972, Elm Tree Books: London, Contents Page, Introduction Page, viii, ix, 2-3, 4-5, 10-11, 18-19, 26-27, 46-47, 64-65, 72-73, 96-97, 112-113.

*Primary Examiner*—Joseph Golian
*Attorney, Agent, or Firm*—Veo Peoples, Jr.

[57] ABSTRACT

A new method for intensifying the inherent flavors of foods and for imparting other desirable organoleptic properties is disclosed. The method consists of adding to foodstuffs a flavor enhancing amount of a heat denatured concentrate of beer. There is also provided a process for producing the above described concentrate.

7 Claims, No Drawings

FLAVOR ENHANCEMENT AND POTENTIATION WITH BEER CONCENTRATE

BACKGROUND OF THE INVENTION

This application is a continuation-in-part of copending application Ser. No. 474,085 filed 3/10/83, and now abandoned.

Foodstuffs of all varieties whether precooked, served hot or cold, or whether prepared without cooking have flavors, aroma, and other organoleptic properties that influence the sensory perceptions of human taste. The manufacturers of such foods as sauces, spreads, dips, soups, dressings, stuffings, garnishes, meats, fish, vegetables, salads, breads, etc. whether dry, frozen, refrigerated or canned, desire to produce products organoleptic properties closely profiling the natural flavors, aromas and textures that appeal broadly to the sensory perceptions of the consuming public. A food whose natural flavors are unduly masked may be too bland, or if overly modified with added flavor components, it may be perceived as too spicy. The availability of spices, condiments, etc., permits the individual consumer to adjust the flavor of food purchased from the shelf to suit his or her particular taste preference.

Nevertheless, food manufactures because of the nature of precooking processes, the addition of preservatives, the packaging and keeping techniques of retorting, pasturization, etc. will often times find that the desired natural flavor of the foodstuff has been suppressed below the threshold taste perceptions of the average consumer. Accordingly, techniques for addressing this deficiency have become customary to the industry.

One such technique involves the use of chemical compounds which intensify the flavors inherently present in food without adding any flavor from the chemical itself. These compounds are known as Flavor Enhancers and include, for example, linalool, 2-nonenal which is used to enhance the flavor of coffee, and certain sulfur containing amino acids which are used to enhance meaty flavors. Other chemicals serve as flavor enhancers through reacting with endogenous flavor components of food itself to synergistically promote the combined flavor effect of those components.

Another technique which is commercially employed to address the problem of suppressed natural flavors is that of using chemical compounds which when added to foods in very low concentrations to catalytically create desirable organoleptic properties of the foodstuff otherwise undetectable. These compounds are known as Flavor Potentiators, and like Flavor Enhancers, their taste is not itself detectable to the sensory perceptions of the ordinary consuming public.

There are drawbacks, however, to the previously known Flavor Enhancers and Potentiators. One foremost disadvantage is that these compounds are selective in their functional contribution to flavor development. The same compound which enhances coffee flavor may have a deleterious effect, if any effect at all, on, for example, cheese flavor. Accordingly, some food products such as soups, dressings and some pastries which have a combined variety of natural flavors are extremely difficult to potentiate or enhance from previously known chemicals.

Another serious drawback to previous flavor enhancement and potentiation techniques is that they require the addition of chemical compounds which have no nutritional value themselves nor are they derived from natural food or beverage constituents.

It has now been found and this finding forms the basis of this invention, that Flavor Enhancement and/or Potentiation can be achieved by the addition of denatured beer concentrate to foodstuffs of all types and varieties, whether cooked or prepared fresh, without the need to employ non-nutritional, chemical compounds.

It should be apreciated that cooking with beer is not new. The book *Cooking With Beer* by Carole Fahy, first published in 1972 by Elm Tree Books, indicates that the brewing of beer is known to have been practiced in Mesopotamia and Egypt at least 5,000 years ago. The Egyptians passed on their knowledge of brewing to the Greeks who in turn handed it down to the Romans who refined the Anglo-Saxon form which was already in place at the time of the Roman conquest. English ale became the basis for many religious and social festivals and is said to have accompanied bread as the sole breakfast menu of Queen Elizabeth I.

Ales and beers are all maufactured beginning with mashing barley malt and possibly grain adjuncts such as barley, corn and rice. This is filtered, brought to boil, pitched with hops and result in a wort which consists of water, dextrine and fermentable sugars. The wort is then fermented with yeast.

English ales have been traditionally distinguished from American brews or lagers primarily on the basis of the type of yeast employed to ferment fermentable sugars of the precursor wort into alcohol. Secondarily, there is a distinction between the ratio of malt and grain adjuncts in the mash in that ales customarily have far less, if any, grain adjuncts. Also there are distinctions in the level of hop addition. These factors contribute significantly to the variations in taste of American brews or lagers and ales.

Beers have gained some limited acceptance in cooking as a consequence of their richness, delightful taste, their ability to improve the texture and lightness of cakes, pies and batters; their tenderizing effect on tough meats; their contribution to preserving foods; their ability to make breads rise; their adding piquancy to dull vegetables and attractively glazing roasted meats and a few other culinary virtues. However, each of these benefits is owed to the full compliment of the beer flavor and texture attributes present naturally and, in the case of assisting cakes to rise, its fermentable state with its residual yeast in active form and its carbonation being readily apparent.

It has been determined however, that the use of beer in cooking does have its limitations. For example, if you are making a soup which requires dried vegetables according to Carole Fahy in *Cooking With Beer*, you must make certain that you soak them thoroughly, overnight, before use because the hard pellets will otherwise sink to the bottom of a rich vegetable beer soup apparently due to slow diffusion of beer molecules through the surface membrane and interior of the dried vegetables. Additionally, when sieving foods as for example, soups, the richer the beer is, the more difficult to push entirely through the strainer without losing some of the desired flavor. Still further, it is found necessary to cook foods longer with beer to fully develop the flavor. Finally, and perhaps most importantly, cooking with beer imparts of a clear beer flavor to the foodstuffs tending to mask the inherent natural flavors of the other foodstuffs. Accordingly, beers, although employed previously in cooking, have not been used nor thought to have any Flavor Enhancing or Potentiation functionality. Likewise, previous beer extracts or concentrates have had no utility in flavor enhancement but rather have been prepared in undenatured form in order to be reconstituted into either alcoholic or nonalcoholic beverages.

British Patent No. 2127 describes the prepration of a nonalcoholic beer extract or concentrate. Although the concentration can be effected in any efficient vacuum evaporation apparatus, the first end to be attained is the separation of the alcohol produced by fermentation at as low a temperature as possible. After separation, as disclosed in this patent, the temperature may be raised, but the subsequent evaporation must be carefully conducted otherwise aromatic compounds present may be expelled or destroyed and the color of the product materially increased. The product is said to be pleasant to the taste and to possess all the nutritive and feeding properties of original beer before removal of the alcohol and subsequent concentration. The product is employed as an ale concentrate designed to be reconstituted into a non-alcohlic beverage by the addition of water.

British Patent No. 1,228,917 discloses a dry extract of a fermented beverage. However, it is compounded with dry yeast in live active form, together with dry fermentable carbohydrates or dry unfermented wort containing fermentable carbohydrates in order to permit fermentation when diluted. The boiling evaporation utilized to produce the extract is under a vacuum high enough to take place at the predetermined low temperature of 100° F. The original fermented beverages and their respective solids or residues and the yeast are protected during evaporation by the low temperatures. The evaporation at yeast-preservisng temperatures with minimum of exposure to the heat also preserves the solubility of the enzymes of yeast and, therefore, the yeast remains in active condition so it will act vigorously when the extract is diluted with water for the prepartion of a beverage.

In British Patent No. 1,290,192, a beer extract is produced from evaporating a partly fermented beverage at temperatures below 80° F. or any other suitably low temperature that will preserve the constituents of the reduced wort in a soluble state. The extract contains fermetable substances with the same characteristics of the beverage from which the extact was made. It possesses the characteristic flavor and taste of the original beverage that can be produced and imparted by yeast fermentation and is naturally alcoholic; and when suitable diluted with water, provides a beverage having the flavor and taste of the original beverage. The yeast, however, is used in large quantity for example, twice as much in respect to the amount of fermentable carbohydrates as is usually employed to pitch ordinary fermented beverages.

SUMMARY OF THE INVENTION

It is an object of the prsent invention to provide a new and useful technique for flavor enhancement and potentiation intensifying the inherent natural flavors of food and creating desirable organoleptic properties to a broad range of foodstuffs with a derivative of a nutritious foodstuff natural concentrate despite having substantially denatured the components of flavor and color, consistency, solubility and fermentability from the concentrate.

It is a further object of this invention to provide a new and useful concentrate of beer and its method of manufacture.

These objects and others are fulfilled by heat treating a fermented malt beverage or beer at sufficiently high temperatures to substantially denature the product and adding it at very low levels to foodstuffs. The denatured beer concentrate is added in amounts below which the concentrate is detectable in taste or mouth feel, but sufficient to achieve flavor enhancement and potentiation.

DETAILED DESCRIPTION OF THE PREFERRED EMBODIMENTS

In this practice of our invention we have found that heat destruction of fermented malt beverages yield a product with unusually broad effectiveness as a flavor enhancer and potentiator when employed at very low levels in foodstuffs.

The fermented malt beverages to undergo denaturization in respect of the present invention, may generally be selected from any of a number of products including pale ale, brown ale, stout, old ale, and lager. Pale ales have an incisive hop flavor and are always pale amber in color. They include what is popularly described in Britain as draught "bitter", and bottled "family", "dinner", and "light" ales. Brown ales, no matter how strong, are always mild in flavor, being brewed with comparatively less hops and more malt and sugar. Stouts are black full-bodied, stronger beers. They are well-hopped, and taste more bitter than the ales. Some stouts are more lightly hopped, sweeter, and are sometimes referred to as "sweet stouts". Old ales are strong but mellow, dark in color and vary in taste considerably from one to the other with a broad range of subtlely different flavors. The ales of all types are fermented with yeast generally referred to as top fermenting yeast, which ferments the wort at the top of the vessel and the residual yeast floats to the top of the vessel which brings about some differences in taste and final dextrim and carbohydrate profiles. Finally, but especially preferred, are lager beers, which are fermented with yeast which has an inverse functionality to the ales because they are bottom fermented. Lagers are more delicately flavored, lightly hopped, and carry a more smoother head of foam and a slightly different carbonation a carbohydrate and dextrim profile.

The denaturization of these products takes place by the effect of high temperature principally and secondarily through combined effect of a heat pressure and agitation as, for example, in a spray drier.

Temperatures range from at least 135° F. to as high as 195° F. and higher, depending upon the degree of residence time and the pressures employed in the equipment selected to denature the product. The process calls for creating an extract with a solids content of from 20 to 100 percent and the character of the extract can be a thick liquid syrup concentrate, or a dry particulate powder. When employed in the form of a concentrate, the product preferably has a solids content of from about 25 to 40 percent by weight.

In the process of this invention, the fermented malt beverages are subjected to evaporation in, for example, a single or multiple effect evaporator. In a double effect evaporator, evaporation is conducted in two stages consisting of a first effect evaporation level at a preferred temperature range of 148° to 178° F., and a second effect preferred temperature range of about 138° to about 162° F. with an average pressure of about 1 psi in the second effect.

In one particular preferred embodiment of this invention, the original beverage is reduced to an essentially dry particulate powder by heat treatment and agitation subsequent to the evaporation steps. Such heat treatment and evaporation may be accomplished through spray drying of an evaporated concentrate at, for example, 190° F. and 2,000 psi pressure. The dry particulate powder is quite hygroscopic and has a moisture content of from about 0 to 20 percent preferably 0 to 12 percent and particularly 7 to 12 percent. This form of the extract serves to particularly overcome previous known drawbacks regarding cooking with beer inasmuch as dry vegetables are often times required to be soaked for a considerable amount of time because beer in undenatured form does not readily diffuse through the vegetable's outer surface when they are in hard pellet form. The extracts of the present invention if in powder form, may be readily hydrated and mixed hand pellets of with dry vegetables without the need for the vegetables to be pre-soaked for extended periods of time.

It is within the contemplation of this invention to add various package and storage and handling aids to the denatured extracts. Such aids may be preservatives, including sodium benzoate, potassium sorbate, propyl paraben. Additionally, flow conditioners may be added after cooling the spray dried concentrate and optionally the spray dried concentrate may be aglomerated to improve its dispersability.

It should be noted that the denaturization is generally characterized by converting the original beverage product to one different in color, dispersability, lacking any active fermentation and containing only trace levels if any of fermentable carbohydrates. The product no longer looks, tastes or behaves like beer, although there are some beer flavor nodes subliminally apparent. Nevertheless, the extracts in concentrated form, although liquid, are not suitable for the palate. Nevertheless, these products do have nutritional value which will be more apparent from the following typical analysis:

| Denatured Beer Extract in Concentrated Form (30% Solids Basis) TYPICAL ANALYSIS | | |
|---|---|---|
| | % | Range % |
| Protein | 3.0 | 2 to 4 |
| Carbohydrates | 26.0 | 20 to 30 |
| Ash | 1.0 | 0.5 to 2 |
| Water | 70.0 | 20 to 80 |
| | 100.0 | |
| Calories: 1.1 per gram | | |
| | mgm/100 grams | |
| Calcium | 0.4 | |
| Phosphorous | 2.1 | |
| Iron | Trace | |
| Sodium | 0.5 | |
| Potassium | 1.7 | |
| Thiamin | Trace | |
| Riboflavin | 0.0002 | |
| Niacin | 0.04 | |

| Denatured Beer Extract in Solid Form (FES) TYPICAL-ANALYSIS | | |
|---|---|---|
| | % | Range % |
| Protein | 9.0 | 6 to 12 |
| Carbohydrates | 80.0 | 70 to 90 |
| Ash | 4.0 | 2 to 6 |
| Moisture | 7.0 | 0 to 12 |
| | 100.0 | |
| Calories: 3.7 per gram | | |
| | mgm/100 grams | |
| Calcium | 1.2 | |
| Phosphorous | 7.0 | |
| Iron | Trace | |
| Sodium | 1.6 | |
| Potassium | 5.8 | |
| Thiamin | Trace | |
| Riboflavin | 0.007 | |
| Niacin | 0.14 | |

The extracts of the present invention may be employed at levels ranging from as low as 0.2 to 1.5 percent by weight of the foodstuff on a dry solids basis, and preferably from 0.3 percent to 1 percent by weight on a dry solids basis. Its functionality in flavor enhancement is comparable to sulfur containing amino acids. Examples of its functionality as a flavor potentiator indicate its effectiveness as comparable to monosodium glutamate in certain nucleic acid derivatives such as nucleotides and nucleosides.

Where founded a particular interest that the extract when in concentrated form from lager beer has trace amounts of isoamyl alcohol, maltotriose and maltose, in contrast to concentrates from ales which lack the trace amounts of these ingredients.

The invention will be better understood from the following examples which are meant to illustrate the specific invention without being a limitation of its scope. One will note the terms, Flavor Enhancer Concentrate utilized in the examples as well as the term Flavor Enhancer Solids. These terms are meant to be equivalent to the term beer extract in concentrated form and in solid form.

EXAMPLE 1

One hundred seventy-seven barrels of beer having a specific gravity of from approximately 1.002 to 1.020, a temperature of 31.6° F. and a pH of 4.8 was fed to an evaporator feed tank having a temperature of 110° F. and from there to the evaporator at an average of 10.8 gallons per minute. The second effect level of the evaporator was set at 50 percent, and the first effect at 75 percent. The average second effect temperature was 153° F., the average first effect temperature was 168° F., and the maximum first effect temperature was 178° F. The average cooling tower water temperature was 71° F. and pulled an average vacuum of 1.p psia. The steam rate was 3500 pounds per hour for better than 50 percent of the run but averaged 3150 pounds per hour. The second effect was sewered upon shutdown to avoid dilution of the product. The total evaporation time was approximatey 11 hours.

The product from the evaporator was fed into a 300 gallon tank and four 55 gallon drums. The average analysis showed a solids level of 37.5 percent and a level of alcohol 0.02 percent, as compared with beer originally fed into the evaporator which had a 4.92 percent solids by weight and 4.78 percent alcohol by weight. The product so produced is referred to herein as flavor enhancer concentrate (FEC).

EXAMPLE 2

The product of Example 1 was further spray dried through a 0.08" diameter nozzle at 190° F. and a pressure of 2000 psi. The average discharge temperature at the fluid bed was 103° F., and the average product temperature was 66° F. The average drying rate was 216 lbs./hr. and the total drying time was 3.3 hours.

The drier yield was 81 percent, and the product had a solids content of 94 percent and no appreciable level of alcohol. This product may be hereafter referred to as flavor enhancer solids (FES).

The spray dried powder is preferably cooled and agglomerated for improved dispersibility and shelf life.

As an alternative, a flow conditioner such as silicon dioxide, talc or malto-dextrin may be dry blended with the spray dried powder.

A panel taste test was conducted measuring barbecue sauce flavored with beer (FEC) flavor enhancer in concentrate form, and (FES) flavor enhancer in dry or power form. The results were as follows:

Each aliquot of barbecue sauce contained the following:

¼ cup oil
1 small onion, chopped
1 clove garlic, chopped
6 tablespoons lemon juice
Beer, or (FEC) concentrate or (FES) powder
2 cups chili sauce
1 tablespoon worchestershire sauce
1 teaspoon salt The oil was heated and the onions and garlic were sauteed until soft. The lemon juice, beer source, chili sauce, and Worchestershire sauce were added and cooked over medium heat until bubbling for about 5 minutes.

The first aliquot of sauce contained two cups of regular beer, or 464.5 grams of beer, and was equivalent to 16.25 grams of beer solids. The flavor description was pleasant tomato spicy flavor.

The second aliquot of sauce instead contained 45.8 grams of (FEC) concentrate at 35.5 percent solids, or equivalent to 16.25 gms. beer solids. The flavor description was spicier, saltier, hotter than the first aliquot and better overall flavor.

The third aliquot of sauce instead contained 17.2 grams of (FES) dried enhancer powder at 94.4 percent solids or equivalent to 16.25 grams beer solids. The flavor description was about the same as aliquot 2 and again spicier than aliquot 1.

APPLICATIONS IN FOOD

It has been found that flavor enhancer concentrate (FEC) and flavor enhancer solids (FES) have flavor enhancing and flavor potentiating effects in foods.

FEC and FES have been found to enhance and intensify the flavor of prepared food products, such as, sauces, condiments, batter breaded seafood and poultry, dips, salad dressings, soups and meat, cheese and vegetable dishes.

Examples of the flavor enhancing and flavor building effect of FEC and FES in food preparations are given in examples 4 through 8.

EXAMPLE 4—BARBECUE SAUCE

FEC and FES were added separately to a commercially prepared barbecue sauce at levels ranging from 0.2 to 1.5% by weight (dry solids basis).

| | Sensory Flavor Evaluation |
|---|---|
| Control (no added FEC or FES) | Tomato, slightly sweet, slightly spicy. |
| BBQ Sauce with FEC or FES added | Greater initial flavor impact and more lasting flavor effect. More rounded flavor. Spicier than control. Brings out taste of various flavor ingredients used in sauce. |

EXAMPLE 5—CHEDDAR CHEESE SOUP

FEC and FES were added separately to a commercially prepared Cheddar Cheese Soup at levels of 0.2 to 1.5% by weight (dry solids basis).

| | Sensory Flavor Evaluation |
|---|---|
| Control (no added FEC or FES) | Mild cheese flavor, creamy, low spice impact. |
| Cheese Soup with FEC or FES added | Cheese tastes more like aged cheddar, more rounded, fuller flavor. More spice impact. |

EXAMPLE 6—CHILI

FEC and FES were added separately to a commercially prepared canned chili at levels of 0.2 to 1.5% by weight (dry solids basis).

| | Sensory Flavor Evaluation |
|---|---|
| Control (no added FEC or FES) | Meaty, slightly spicy taste. |
| Chili with FEC or FES added | More meaty flavor impact, spicier. More lasting flavor effect. |

EXAMPLE 7—HOT MUSTARD

A hot (Chinese) style mustard was prepared by blending equal parts of mustard powder and dry milk powder and adding 1% by weight of FES (powder).

| | Sensory Flavor Evaluation |
|---|---|
| Control (no FES added) | Typical mustard flavor, not spicy, not hot. |
| Mustard with FES added | Very hot, spicy prepared mustard. |

OTHER FLAVOR ENHANCER APPLICATIONS

EXAMPLE 8

| Product | With (FES) Flavor Enhancer Solids Added (vs. "as is" control) (0.3 to 1.0% by wt. dry solids basis) |
|---|---|
| Chicken Gravy Mix | More chicken flavor |
| Cheese Sauce Mix | More cheddar cheese flavor |
| Mushroom Gravy Mix | More flavorful |
| Beef Stew Seasoning Mix | Spicier, hotter, saltier |
| Chili Seasoning Mix | Spicier, hotter, saltier |
| French Onion Soup | More mellow, parmesan cheese flavor comes through |
| Cheddar Cheese Soup | More cheddar cheese flavor |
| Tomato Soup | More mellow, more tomato |
| Pork and Beans | Slightly spicier |

-continued

| Product | With (FES) Flavor Enhancer Solids Added (vs. "as is" control) (0.3 to 1.0% by wt. dry solids basis) |
|---|---|
| Cheddar Cheese Spread | More cheddar cheese flavor |
| Homestyle Spaghetti Sauce | More rounded flavor, tomato and spice are enhanced |
| Ketchup | Spicier, more tomato flavor |
| Blue Cheese Dressing | Richer, creamier, with more cooked egg flavor |
| Chili Con Carne | Fuller flavor, spicier |
| Prepared Mustard | Hotter, more mustard flavor |
| Thousand Island Dressing | More rounded flavor, richer tasting |
| Catalina French Dressing | More rounded flavor, better tomato flavor |
| French Dressing | Fuller flavored, more cooked egg and mustard flavor, spicier |
| Steak Sauce | Spicier, saltier, more intense flavor |

Qualitative gas liquid chromatography (GLC) and high pressure liquid chromatography (HLPC) headspace analysis found traces of acetaldehyde, isobutyl alcohol, ethyl acetate and ethyl butyrate compounds to be present in both the flavor enhancer solids (FES) and the flavor enhancer concentrate (FEC). These flavor components are normally found in beer. No unknown peaks were detected using the above mentioned instruments.

Flavor components, such as, n-propanol, ethanol, active amyl alcohol, isoamyl alcohol, isobutyl acetate, isoamyl acetate and ethyl caproate were not found in the GLC analysis using a flame ionization detector (FID). The headspace analysis technique performed on the FES and FEC samples could measure the preceding compounds at beer levels, if present.

GLC headspace analysis of FES and FEC using an electron capture detector (EC) indicated levels of diacetyl and 2-3 pentanedione compounds at beer levels. No other peaks were detected by this method.

Carbohydrate profile of the FES and FEC samples using HLPC conditions gave chromatograms which are very similar to that of regular beer. No other peaks were detected by this test.

Description of the GLC and HPLC test procedures used in the above evaluations is given in examples 9, 10, and 11 below.

EXAMPLE 9

Headspace GLC-FID (Flame Ionization Detector)

Flavor enhancer concentrate (FEC) and flavor enhancer solids (FES) samples were diluted to contain 3.75% solids before analysis.

Instrument Condition a. Column 6'×2 mm glass packed with 80/100 Carbopack C/0.1% Sp 1000.
b. Flow 22 ml/minute nitrogen.
c. Temperature Program: 70° C.–120° C. at 6°/minute, hold 2 minutes. 120° C.–225° C. at 10° minute, hold 8 minutes.
d. 65° C. equilibration bath for 2 hours.

EXAMPLE 10

Headspace EC (Electron Capture Detector)

FEC and FES samples were diluted to 3.75% solids before analysis.

Instrument Conditions a. Column 6'×2 mm glass packed with Carbopack C/0.2% CW 1500.
b. Flow 30 ml/minute 5% Methane/Argon.
c. Column Temperature: 95° C.
d. 50° C. equilibration bath for 2 hours.

EXAMPLE 11

HPLC—Carbohydrate Profile

FEC and FES samples were diluted to 3.75% solids before analysis.

Instrument Conditions a. Carbohydrate Column.
b. 3.0 ml/minute 70/30 acetonitrile/H2O isocratic.

EXAMPLE 12

We determined the HPLC and GLC volatile profiles on an ale concentrate and compared it to a beer flavor concentrate. The ale concentrate and the beer concentrate were diluted to 3.75% solids before testing. In the results section the instrument, the detector and type of analysis are listed along with the compounds detected by that particular method for each of the concentrates.

RESULTS:

| Instrument: | GLC | GLC | HPLC | — |
|---|---|---|---|---|
| Detector: | ECD | FID | — | — |
| Type of Analysis: | Headspace | Headspace and CS2 Extraction | Carbohydrate | IBU |
| Ale Concentrate | Diacetyl 2,3 Pentanedione | Acetaldehyde Phenyl Ethyl Alcohol | Dextrin | 16.0 |
| Beer Concentrate | Diacetyl 2,3 Pentanedione | Acetaldehyde Phenyl Ethyl Alcohol- Isoamyl Alcohol | Dextrin Maltotriose (trace) Maltose (trace) | 12.5 |

EXAMPLE 13

Sensory evaluation was done to determine if any flavor differences could be detected between prepared recipes made with beer versus Eagle Flavor Enhancer (EFE) beer flavor concentrate.

Recipes were taken from *Cooking With Beer* by Carole Fahy and included spice cake, frankfurters, cheese dip and cole slaw. Canned Budweiser beer was compared to the EFE concentrate. Triangle tests were run (except with the spice cake), to determine any detectable differences. The recipes for the spice cake, frankfurters, cheese dip and coleslaw are taken from pages 113, 29, 88 and 77 respectively from Carole Fahy's book "Cooking With Beer".

In a triangle test, panelists are given two samples that are alike and one that is different. They are asked to identify the odd sample. Since the spice case was so highly seasoned, a duo-trio test was run. This test includes two samples and a reference, which is identical to one of the samples. Panelists are asked to determine which sample is siilar to the reference. In both tests they were also asked to indicate a preference and give reasons for that preference.

The results showed significant differences at the 95% confidence level between the samples of cole slaw and frankfurters made with beer and EFE concentrate. Panelists were not able to detect significant differences between the spice cakes or the cheese dips.

The remainder of the results were as follows:

| Sample | No. of Panelists | No. Identifying the odd sample | No. Preferring Sample w/beer | No. Preferring Sample w/EFE | Reasons for Preference |
|---|---|---|---|---|---|
| Cole Slaw | 35 | 18(2) | 1 | 17(2) | EFE-Better Beer-Bitter Beery Sour |
| Frankfurters | 32 | 17(2) | 4 | 13(2) | EFE-No off Flavors Beer-Bitter Beery |
| Spice Cake | 34 | 17 | — | — | |
| Cheese Dip | 31 | 10 | — | — | |

(1)Tabulation reflects only tasters who correctly identified the odd sample.
(2)Significant at the 95% confidence level.

The panelists seems to have difficulty detecting differences when the samples were more highly flavored, i.e, the spice cake and cheese dip.

When significant differences were detected, there was a definite preference towards the sample with EFE. Generally, it was preferred because it lacked the off flavors that were in the samples containing beer. A detailed list of the reasons for preference for the cole slaw and frankfurters are below:

| | With Beer | With EFE Concentrate |
|---|---|---|
| COLE SLAW Reason for Preference* | | |
| Not strong in Onion Flavor | 1 | |
| Better Flavor | | 3 |
| Not Sour | | 7 |
| Fresher Flavor | | 1 |
| Not Beery | | 4 |
| Slightly Sweet | | 1 |
| Less Flavor | | 1 |
| Not Bitter | | 4 |
| More Flavor | | 2 |
| Creamier | | 2 |
| Spicier | | 1 |
| FRANKFURTERS Reason for Preference** | | |
| WINE flavor | 1 | |
| Spicier | 3 | 1 |
| Not Beery | | 3 |
| Not Sour | | 2 |
| Not Bitter | | 2 |
| No Off Flavor | | 2 |
| Better Flavor | | 1 |

*17 preferred the cole slaw containing EFE concentrate
1 preferred the cole slaw containing beer.
17 could not identify the odd sample in the difference test.
Significant difference in preference at the 95% confidence level.
From Above Reason: Cole slaw with EFE concentrate was not sour, bitter or beery as was the sample containing beer.
**13 preferred the sample containing EFE concentrate.
4 preferred the sample containing beer.
16 could not identify the odd sample.
Significant difference in preference at the 95% confidence level.

What is claimed is:

1. A method for intensifying the flavors of prepared food products comprising adding to a food formulation foodstuffs a heat denatured concentrate of beer in an amount below the point that the concentrate is detectable in taste or mouthfeel but sufficient to achieve flavor enhancement and potentiation, the amount being in the range of about 0.2 percent to about 1.5 percent by weight of the foodstuff on a dry solids basis, said concentrate having had its beer flavor components substantially removed and its fermentative characteristics substantially retarded, the concentrate being prepared by evaporating a fermented malt beverage at a temperature of at least 135° F. until a concentrate is prepared having a solids content of at least 20 percent whereby the foodstuff can have its natural flavors accented and enhanced without the need for chemical modifiers.

2. The method of claim 1 wherein the heat natured concentrate of beer is a concentrate having a solids content of from about 25 to 40 percent by weight.

3. The method of claim 2 wherein the concentrate has a solids content of about 30 percent.

4. The method of claim 1 where the heat denatured concentrate of beer is a dry particulate powder having a moisture content of from about 0 to about 20 percent.

5. The method of claim 4 wherein the moisture content is from about 0 to about 12 percent.

6. The method of claim 4 wherein the moisture content is from about 7 to about 12 percent.

7. The method of claim 1 wherein the concentrate is added in an amount of from about 0.3 percent to about 1.0 percent by weight of the foodstuff on a dry solids basis.

* * * * *